W. A. Ives.
Hollow Auger.
No. 82,957.      Patented Oct. 13, 1868.
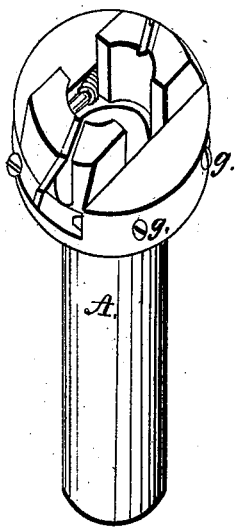
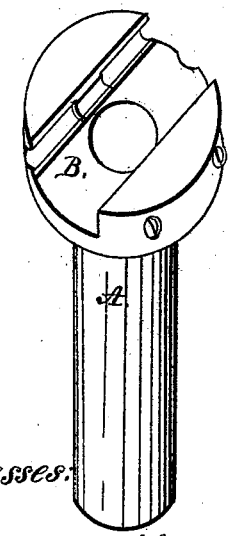
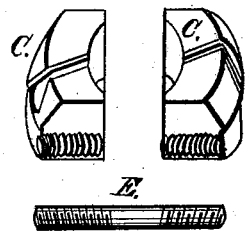
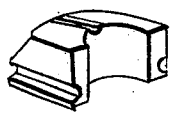
Witnesses:
Lockwood Sanford
Wm Fitch
Inventor:
W. A. Ives

W. A. IVES, OF NEW HAVEN, CONNECTICUT.

Letters Patent No. 82,957, dated October 13, 1868.

IMPROVEMENT IN HOLLOW AUGERS.

The Schedule referred to in these Letters Patent and making part of the same.

Be it known, that I, W. A. IVES, of New Haven, and State of Connecticut, have invented a new and improved mode of constructing the Tenoning-Machine or Hollow Auger; and the following is a full description thereof, reference being had to the accompanying drawing.

I take the ordinary casting, or circular stock A, of suitable size for a ¾ auger. Across the head I cut a slot, B, about a half inch deep, and of suitable width for cutting the largest-size tenon. Into this slot I fit two movable dies or knife-holders C C, with grooves in their sides. Into one side of the slot I insert a right and left hand-screw E. About half its diameter is let into the edge of the slot, and the other half works into a corresponding thread in the groove of the holder. This screw is held stationary by a collar in and near the centre of the slot.

The cutters are set angular or laid horizontally, as desired.

To keep the dies in place, and hold them firmly when the machine is in use, I insert in the opposite side of the casting two screws $g\ g$, the points reach ing through and fitting into the grooves, one scre against each die.

The size of the tenon to be cut is regulated b simply turning the screw E, by which the knives a both moved at the same time and in opposite dire tions, and will cut from three-eighths of an inch to o inch and a half; and as the cutters move directly fo ward and backward, the angle is always the same.

I do not claim the screw E nor the movable knif holders, as such; but

What I do claim, and wish to secure by Lette Patent, is—

The combination of the circular stock A, slot B, an screw E, and two movable jaws or knife-holders C ( constructed and operated substantially for the pu poses and in the manner as above specified.

W. A. IVES.

Witnesses:
H. C. WARREN,
GEORGE R. NOTT.